(12) United States Patent
Kwak et al.

(10) Patent No.: US 9,971,016 B2
(45) Date of Patent: May 15, 2018

(54) WIRELESS SIGNAL IDENTIFICATION

(71) Applicant: Empire Technology Development LLC, Wilmington, DE (US)

(72) Inventors: Jin Sam Kwak, Gyeonggi-do (KR); Hyun Oh Oh, Gyeonggi-do (KR); Ju Hyung Son, Gyeonggi-do (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

(21) Appl. No.: 14/785,650

(22) PCT Filed: Apr. 30, 2014

(86) PCT No.: PCT/US2014/036080
§ 371 (c)(1),
(2) Date: Oct. 20, 2015

(87) PCT Pub. No.: WO2015/167506
PCT Pub. Date: Nov. 5, 2015

(65) Prior Publication Data
US 2016/0124073 A1     May 5, 2016

(51) Int. Cl.
*H04W 64/00*  (2009.01)
*G01S 5/10*   (2006.01)
*G01S 1/08*   (2006.01)
*G01S 5/02*   (2010.01)

(52) U.S. Cl.
CPC .................. *G01S 5/10* (2013.01); *G01S 1/08* (2013.01); *G01S 5/02* (2013.01); *G01S 5/0215* (2013.01); *H04W 64/00* (2013.01)

(58) Field of Classification Search
CPC .... G01S 1/08; G01S 5/02; G01S 5/10; H04W 64/00
USPC .............................. 455/456.1–456.5
See application file for complete search history.

(56) References Cited

U.S. PATENT DOCUMENTS

| 8,077,079 B2 | 12/2011 | Kaiser et al. |
| 8,270,905 B1 | 9/2012 | Cahill et al. |
| 2012/0013509 A1 | 1/2012 | Wisherd et al. |
| 2013/0122941 A1 | 5/2013 | Das et al. |

(Continued)

FOREIGN PATENT DOCUMENTS

EP     2542001 A1    2/2013

OTHER PUBLICATIONS

Bahl, P., and Padmanabhan, V.N., "RADAR: An in-building RF-based user location and tracking System," In Proceedings of the IEEE Nineteenth Annual Joint Conference on Computer Communications, vol. 2, pp. 775-784 (Mar. 26-30, 2000).

(Continued)

*Primary Examiner* — Sam Bhattacharya

(57) ABSTRACT

Technologies are generally described for identifying whether a propagation path between a mobile device and an access point is line-of-sight. In some examples, a method performed under control of a mobile device may include receiving, from an access point, a first signal transmitted at a first frequency band; receiving, from the access point, a second signal transmitted at a second frequency band; measuring a difference value between propagation properties of the first signal and the second signal; and identifying whether a propagation path between the mobile device and the access point is line-of-sight or non-line-of-sight based at least in part on the difference value.

23 Claims, 8 Drawing Sheets

(56) References Cited

U.S. PATENT DOCUMENTS

2014/0050210 A1    2/2014    Waters et al.

OTHER PUBLICATIONS

Cheng, Y., et al., "Accuracy Characterization for Metropolitan-scale Wi-Fi," Proceedings of the 3rd international conference on Mobile systems, applications, and services, pp. 233-245, (Jan. 2005).

Dobkin, D., "Indoor Propagation and Wavelength," WJ Communications, pp. 1-8 (Jul. 10, 2002).

Hwang, C., and Cheng, K., "Wi-Fi Indoor Location Based on RSS Hyper-Planes Method," Chung Hua Journal of Science and Engineering, vol. 5, No. 4, pp. 37-43 (2007).

International Search Report and Written Opinion for International Application No. PCT/US14/36080, dated Sep. 26, 2014.

Lim, H., et al., "Zero-Configuration, Robust Indoor Localization: Theory and Experimentation," Proceedings of 25th IEEE International Conference on Computer Communications, pp. 1-13 (Apr. 2006).

Liu, H., et al., "Push the Limit of WiFi based Localization for Smartphones," Proceedings of the 18th annual international conference on Mobile computing and networking, pp. 305-316 (Aug. 22, 2012).

Röhrig, C., and Müller, M., "Indoor Location Tracking in Non-line-of-Sight Environments Using a IEEE 802.15.4a Wireless Network," In Proceeding of IEEE/RSJ International Conference on Intelligent Robots and Systems, pp. 552-557 (Oct. 10-15, 2009).

Seow, C. K., and Tan, S.Y., "Non-Line-of-Sight Localization in Multipath Environments," IEEE Transactions on Mobile Computing, vol. 7, Issue 5, pp. 647-660 (May 2008).

Thorbjornsen, B., et al., "Radio Frequency (RF) Time-of-Flight Ranging for Wireless Sensor Networks," Measurement Science and Technology, vol. 21, No. 3, pp. 1-22 (Jan. 25, 2010).

Wang, Y., et al., "An Indoor Mobile Localization Strategy for Robot in NLOS Environment," International Journal of Distributed Sensor Networks, vol. 2013, Article ID 758749, pp. 1-8 (Dec. 17, 2012).

Weng, Y., et al., "Total least squares method for robust source localization in sensor networks using TDOA measurements," International Journal of Distributed Sensor Networks, vol. 2011, Article ID 172902, pp. 1-8 (Jun. 15, 2011).

Wilson, R., "Propagation Losses Through Common Building Materials 2.4 GHz vs 5 GHz," Magis Networks, Inc., pp. 1-28 (Aug. 2002).

Zagami, J.M., et al., "Providing Universal Location Services Using a Wireless E911 Location Network", IEEE Communications Magazine, vol. 36, Issue 4, pp. 66-71 (Apr. 1998).

WIRELESS SIGNAL IDENTIFICATION

CROSS-REFERENCE TO RELATED APPLICATION

This Application is the U.S. National Stage filing under 35 U.S.C. § 371 of International Application No. PCT/US14/36080, filed on Apr. 30, 2014. The disclosure of the International Application is hereby incorporated herein by reference in its entirety.

BACKGROUND

Location estimation in wireless technology has attracted great interests in recent research, because it is an important task in various applications of wireless communications. Further, attention on developing an indoor location technology based on the wireless local area network (WLAN) is gradually increasing while the population of the WLAN is growing. The superiority in using this technique can utilize the existing hardware without affecting the original network access function, and will also create a popular value added.

SUMMARY

In an example, a method performed under control of a mobile device may include receiving, from an access point, a first signal transmitted at a first frequency band; receiving, from the access point, a second signal transmitted at a second frequency band; measuring a difference value between propagation properties of the first signal and the second signal; and identifying whether a propagation path between the mobile device and the access point is line-of-sight or non-line-of-sight based at least in part on the difference value.

In another example, a mobile device may include a receiver unit configured to receive, from an access point, a first signal transmitted at a first frequency band and a second signal transmitted at a second frequency band; a difference value calculation unit configured to calculate a difference value between propagation properties of the first signal and the second signal; an identification unit configured to identify whether a propagation path between the mobile device and the access point is line-of-sight or non-line-of-sight based at least in part on the difference value; and a position calculation unit configured to calculate a current position of the mobile device based at least in part on the first signal and/or the second signal.

In yet another example, a computer-readable storage medium may store thereon computer-executable instructions that, in response to execution, cause a mobile device to perform operations, including transmitting, to an access point, a probe request signal at a first frequency band; receiving, from the access point, a probe response signal transmitted at the first frequency band in response to the probe request signal; receiving, from the access point, a beacon signal transmitted at a second frequency band; measuring a difference value between propagation properties of the probe response signal and the beacon signal; and identifying whether a propagation path between the mobile device and the access point is line-of-sight or non-line-of-sight based at least in part on the difference value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
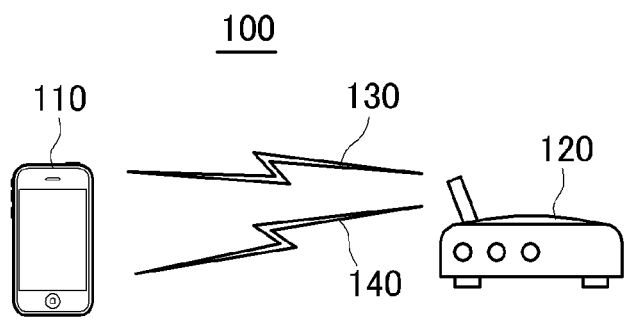
FIG. 1 shows an illustrative example of a wireless communication environment including a mobile device and an access point, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to identify a wireless signal from an access point. Further, technologies are herein generally described for identifying whether a propagation path between a mobile device and an access point is line-of-sight or non-line-of-sight based on properties of multiple signals each transmitted, from the access point, at a different frequency band to provide more accurate position information of the mobile device.

In some examples, a mobile device may be configured to receive, from an access point, a first signal and a second signal respectively transmitted at a first frequency band and a second frequency band. In such cases, propagation properties of the first frequency band and the second frequency band may be different. By way of example, but not limitation, the first frequency band may be an industry-science-medical (ISM) band of about 2.4 GHz and the second frequency band may be a unlicensed national information infrastructure (UNII) band of about 5 GHz. By way of non-limiting example, the propagation property may include, but not limited thereto, a propagation loss, a reflection property, a diffraction property or an absorption property.

The mobile device may be configured to measure a difference value between the propagation properties of the first signal and the second signal. Further, the mobile device may be configured to identify whether a propagation path between the mobile device and the access point is line-of-sight or non-line-of-sight based at least in part on the difference value. By way of example, but not limitation, a difference value of propagation losses between the ISM band and the UNII band is normally about 6.8 dB. However, the difference value may be higher than the normal value when there are obstacles (such as, for example, walls, furniture, etc.) between the mobile device and the access point (that is, the propagation path between the mobile device and the access point is non-line-of-sight). The mobile device may determine that the propagation path between the mobile device and the access point is non-line-of-sight when the difference value is higher than the normal value.

In some examples, the mobile device may be further configured to receive, from the access point, a propagation environment signal, which may include, for example, at least one of information about a layout of a building, in which the access point and the mobile device are located, or information about materials of the building. In such cases, the mobile device may be further configured to identify whether the propagation path is line-of-sight or non-line-of-sight based on the propagation environment signal.

In some examples, the first signal and/or the second signal transmitted from the access point may include location information of the access point, and the mobile device may be configured to calculate a current position of the mobile device based on the location information of the access point. Further, the mobile device may use the location information to calculate the current position of the mobile device only when the propagation path is identified as being line-of-sight. By way of example, but not limitation, the mobile device may receive signals from multiple access points (including the access point) and calculate the current position of the mobile device using triangulation based on respective location information of the multiple access points.

FIG. 1 shows an illustrative example of a wireless communication environment 100 including a mobile device 110 and an access point 120, arranged in accordance with at least some embodiments described herein. For example, but not as a limitation, mobile device 110 may refer to at least one of a smart phone, a portable device, a notebook computer, a tablet device, a phablet device, a personal computer or a personal communication terminal, such as PCS (Personal Communication System), GMS (Global System for Mobile communications), PDC (Personal Digital Cellular), or PDA (Personal Digital Assistant).

Access point 120 may be configured to provide wireless communication capability to one or more devices, including mobile device 110, located within its communication range. Access point 120 may be configured to transmit, to mobile device 110, a first signal 130 at a first frequency band. Further, access point 120 may be configured to transmit, to mobile device 110, a second signal 140 at a second frequency band that is different from the first frequency band. In some embodiments, access point 120 may receive a probe request signal from mobile device 110 and, in response to the probe request signal, transmit, to mobile device 110, first signal 130 (which may be a probe response signal) at the first frequency band. In the present disclosure, it is assumed that a propagation property (such as, for example, a propagation loss, a reflection property, a diffraction property or an absorption property) of the first frequency band is different from that of the second frequency band.

In some embodiments, mobile device 110 may be configured to receive first signal 130 at the first frequency band and second signal 140 at the second frequency band. Mobile device 110 may be configured to measure a propagation property of first signal 130 and that of second signal 140 and measure a difference value between propagation properties of first signal 130 and second signal 140. Mobile device 110 may then be configured to identify whether a propagation path between mobile device 110 and access point 120 is line-of-sight or non-line-of-sight based on the measured difference value. In some embodiments, mobile device 110 may compare the measured difference value with a normal difference value of free-space propagation. In such cases, when the measured difference value is higher than the normal difference value of free-space propagation, mobile device 110 may determine that the propagation path between mobile device 110 and access point 120 is non-line-of-sight.

By way of non-limiting example, access point 120 may include a wireless-fidelity (Wi-Fi) access point based on IEEE 802.11a/b/g/n/ac. Such Wi-Fi access point is capable to use an ISM band and a UNII band to perform wireless communication. Available frequency resources at the Wi-Fi access point may include fourteen (14) channels at the ISM band (2.412 to 2.472 GHz; represented by 2.4 GHz) and twenty four (24) channels at the UNII band (5.180 to 5.825 GHz; represented by 5 GHz). In such examples, the first frequency band may correspond to the ISM band and the second frequency band may correspond to the UNII band. Further, mobile device 110 may be equipped with a Wi-Fi chipset, which can provide wireless communication capability at both of the ISM band and the UNII band, so that mobile device 110 may be able to perform wireless communication with access point 120 through both of the ISM band and the UNII band.

Propagation properties in the ISM band and the UNII band may have inherent characteristics due to the difference in frequency bands, as below. For example, the difference of propagation losses between 2.4 GHz and the 5 GHz is normally around 6.8 dB. If the difference of propagation losses is over 15 dB, mobile device 110 may determine that the propagation path between mobile device 110 and access point 120 is non-line-of-sight.

In some embodiments, mobile device 110 may be configured to concurrently receive first signal 130 at the first frequency band and second signal 140 at the second frequency band. In some other embodiments, mobile device 110 may perform an active scanning (for example, transmitting a probe request signal to access point 120) at the first frequency and receive first signal 130 (for example, a probe response signal) from access point 120. In such cases, mobile device 110 may then perform a passive scanning (for example, receiving a beacon signal from access point 120) at the second frequency band.

In some embodiments, at least one of first signal 130 or second signal 140 may be configured to include location information of access point 120. Mobile device 110, which has received first signal 130 and second signal 140, may calculate a current position of mobile device 110 using the location information of access point 120 together with location information of one or more other access points. By way of example, but not limitation, mobile device 110 may calculate the current position using triangulation based on respective location information of the multiple access points. In some embodiments, mobile device 110 may be configured to calculate the current position based only on access points that are located in a line-of-sight path. That is, when mobile device 110 determines that the propagation path between mobile device 110 and access point 120 is non-line-of-sight, mobile device 110 may not use the location information of access point 120 to calculate the current position of mobile device 110.

In some examples, mobile device 110 may be configured to receive a propagation environment signal from access point 120. In the examples of using the ISM band and the UNII band, mobile device 110 may receive the propagation environment signal at the ISM band. By way of example, but not limitation, the propagation environment signal may include at least one of information about a layout of a building, in which mobile device 110 and access point 120 are located, or information about materials of the building. In such cases, mobile device 110 may be further configured to identify whether the propagation path is line-of-sight or non-line-of-sight based on the propagation environment signal.

Figure 2:
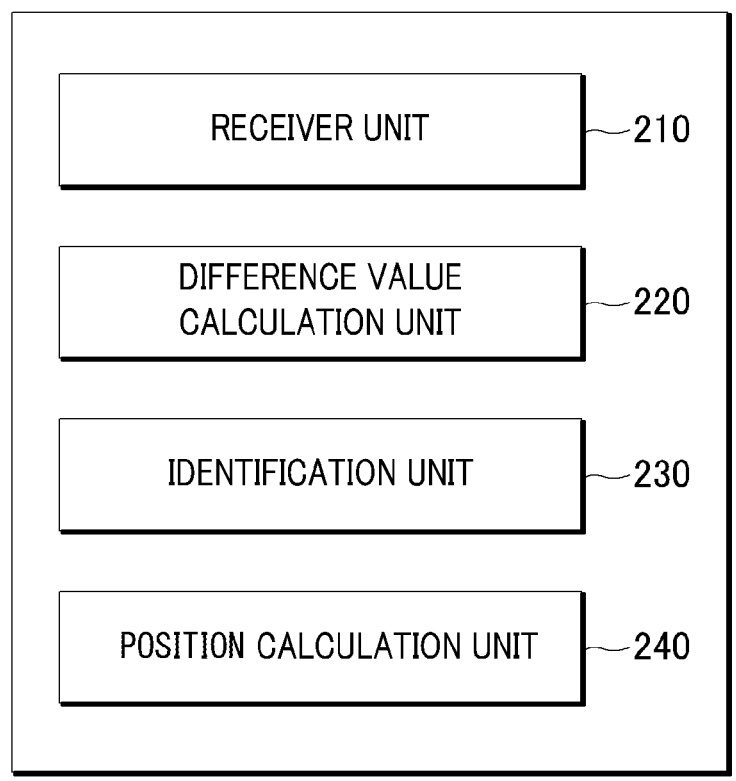
FIG. 2 shows a block diagram of an example architecture of a mobile device configured to implement a wireless signal identification scheme, arranged in accordance with at least some embodiments described herein.

FIG. 2 shows a block diagram of an example architecture of mobile device 110 configured to implement a wireless signal identification scheme, arranged in accordance with at least some embodiments described herein. Reference may be made to the embodiments depicted and described with reference to FIG. 1.

As depicted, mobile device 110 may include a receiver unit 210, a difference value calculation unit 220, an identification unit 230 and a position calculation unit 240. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

Receiver unit 210 may be configured to receive, from access point 110, first signal 130 at the first frequency band and second signal 140 at the second frequency band. In some embodiments, receiver unit 210 may receive first signal 130 and second signal 140 concurrently. In some embodiments, receiver unit 210 may receive first signal 130 first and then second signal 140 later. By way of example, the first frequency band may be an ISM band of 2.4 GHz and the second frequency band may be a UNII band of 5 GHz. In some embodiments, receiver unit may be further configured to receive a propagation environment signal from access point 120. The propagation environment signal may be received at the first frequency band. By way of example, but not limitation, the propagation environment signal may include at least one of information about a layout of a building, in which mobile device 110 and access point 120 are located, or information about materials of the building.

Difference value calculation unit 220 may be configured to measure a propagation property of first signal 130 and that of second signal 140 and calculate a difference value between propagation properties of first signal 130 and second signal 140. By way of example, but not limitation, the propagation property may include a propagation loss, a reflection property, a diffraction property or an absorption property.

Identification unit 230 may be configured to identify whether a propagation path between mobile device 110 and access point 120 is line-of-sight or non-line-of-sight based on the calculated difference value. In some embodiments, identification unit 230 may compare the calculated difference value with a normal difference value of free-space propagation. In such cases, when the calculated difference value is higher than the normal difference value of free-space propagation, identification unit 230 may determine that the propagation path between mobile device 110 and access point 120 is non-line-of-sight. In some embodiments, identification unit 230 may further make a reference to the propagation environment signal received by receiver unit 210 for the determination, and such reference may contribute to a more precise determination.

Position calculation unit 240 may be configured to calculate a current position of mobile device 110 based at least in part on first signal 130 and/or second signal 140. In such cases, at least one of first signal 130 or second signal 140 may include location information of access point 120. By way of example, but not limitation, mobile device 110 may calculate the current position using triangulation based on respective location information of multiple access points including access point 120. In some embodiments, position calculation unit 240 may be configured to calculate the current position based only on access points that are located in a line-of-sight path. That is, when identification unit 230 determines that the propagation path between mobile device 110 and access point 120 is non-line-of-sight, position calculation unit 240 may not use the location information of access point 120 to calculate the current position of mobile device 110.

Figure 3:
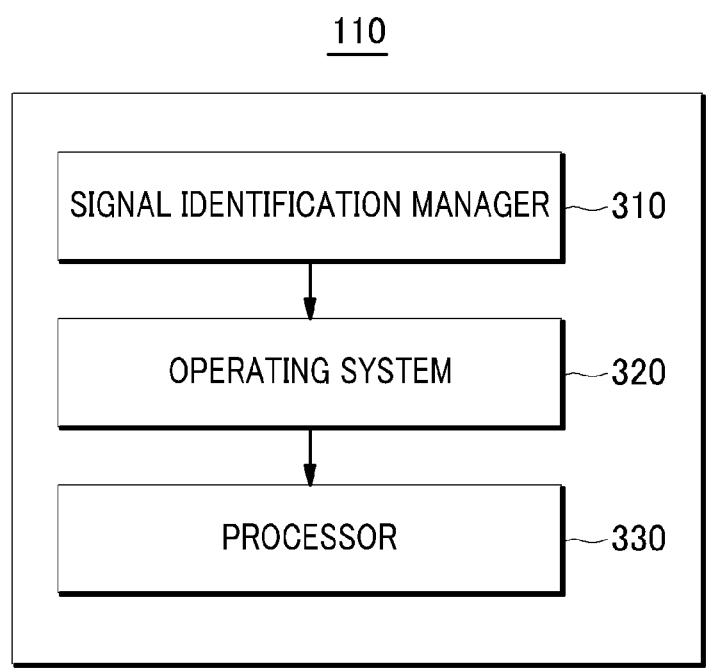
FIG. 3 shows a block diagram of another example architecture of a mobile device configured to implement a wireless signal identification scheme, arranged in accordance with at least some embodiments described herein.

FIG. 3 shows a block diagram of another example architecture of mobile device 110 configured to implement a wireless signal identification scheme, arranged in accordance with at least some embodiments described herein. Reference may be made to the embodiments depicted and described with reference to FIGS. 1 and 2.

As depicted, mobile device 110 may include a signal identification manager 310, an operating system 320 and a processor 330. Signal identification manager 310 may be adapted to operate on operating system 320 such that the wireless signal identification scheme, as described herein, may be provided. Operating system 320 may allow signal identification manager 310 to manipulate processor 330 to implement the wireless signal identification scheme as described herein.

Figure 4:
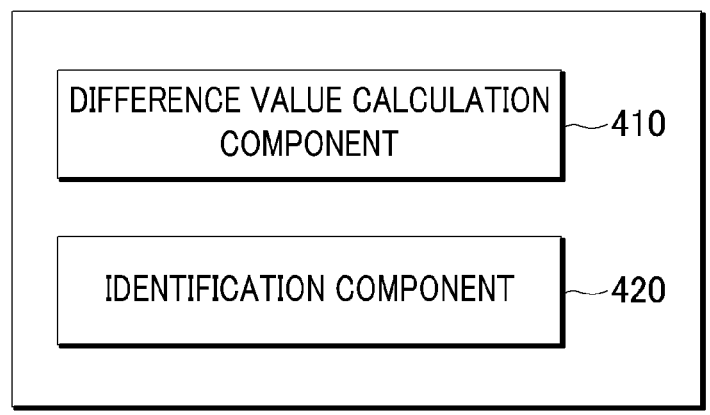
FIG. 4 shows a block diagram of an example architecture of a signal identification manager to implement a wireless signal identification scheme, arranged in accordance with at least some embodiments described herein.

FIG. 4 shows a block diagram of an example architecture of signal identification manager 310 to implement a wireless signal identification scheme, arranged in accordance with at least some embodiments described herein. Reference may be made to the embodiments depicted and described with reference to FIGS. 1 to 3.

As depicted, signal identification manager 310 may include a difference value calculation component 410 and an identification component 420. Difference value calculation component 410 may be adapted to calculate a difference value between propagation properties of first signal 130 and second signal 140, in accordance with various example methods as described above. Identification component 420 may be adapted to identify whether a propagation path between mobile device 110 and access point 120 is line-of-sight or non-line-of-sight based at least in part on the calculated difference value, in accordance with various example methods as described above.

Figure 5:
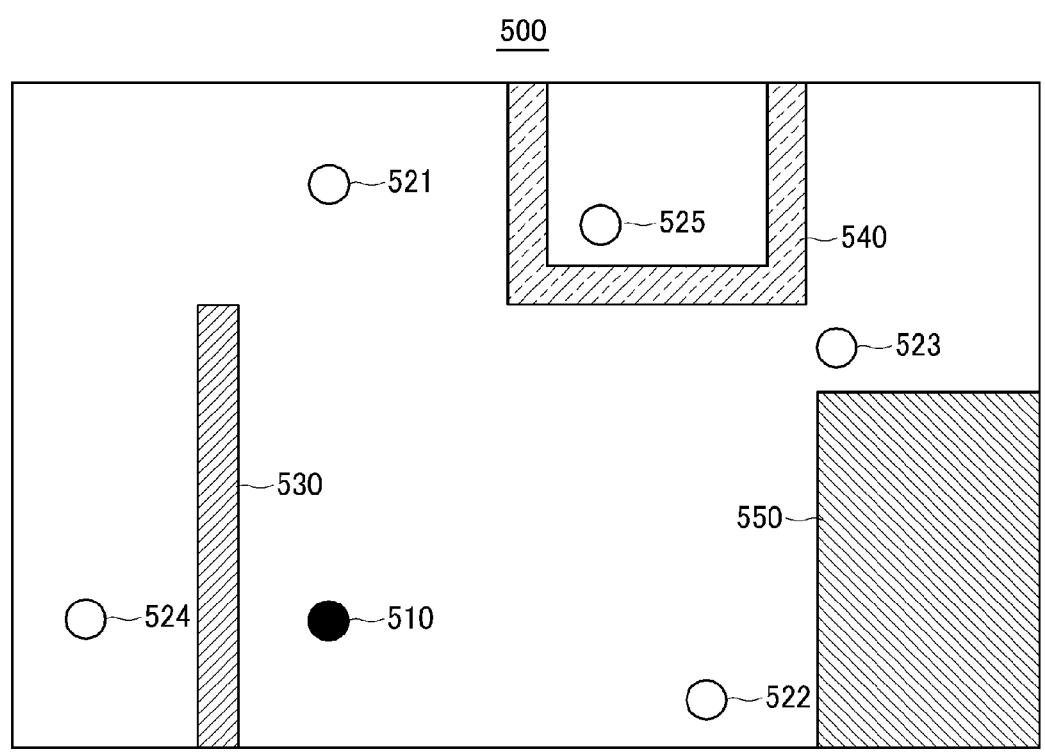
FIG. 5 shows an illustrative example of an indoor place in which a mobile device and multiple access points are located, arranged in accordance with at least some embodiments described herein.

FIG. 5 shows an illustrative example of an indoor place in which a mobile device 510 and multiple access points 521, 522, 523, 524 and 525 are located, arranged in accordance with at least some embodiments described herein.

As depicted, access points 521 to 525 are located in various positions in the indoor place, in which a hallway wall 530, a room 540 and a block 550 are arranged to divide the indoor place. Mobile device 510, which is located in the indoor place, may receive signals from access points 521 to 525.

In some embodiments, mobile device 510 may receive a first signal at a first frequency band and a second signal at a second frequency band from each of access points 521 to 525. The first signal and the second signal may be received at mobile device 510 concurrently or sequentially. Mobile device 510 may then measure and/or calculate a difference value between propagation properties of the first signal and the second signal for each of access points 521 to 525 and identify whether each propagation path between mobile device 510 and each of access points 521 to 525 is line-of-sight or non-line-of-sight based on corresponding difference value.

As depicted in FIG. 5, there are no obstacles between mobile device 510 and access points 521 to 523, and thus, it may be determined that the propagation paths between mobile device 510 and access points 521 to 523 are line-of-sight. However, access points 524 and 525 are blocked by hallway wall 530 and room 540, respectively, and the propagation paths between mobile device 510 and access points 524 and 525 are non-line-of-sight. In some embodiments, mobile device 510 may receive location information from each of access points 521 to 523, of which the propagation path is line-of-sight, to calculate a current position of mobile device 510 using triangulation based the received location information.

Figure 6:
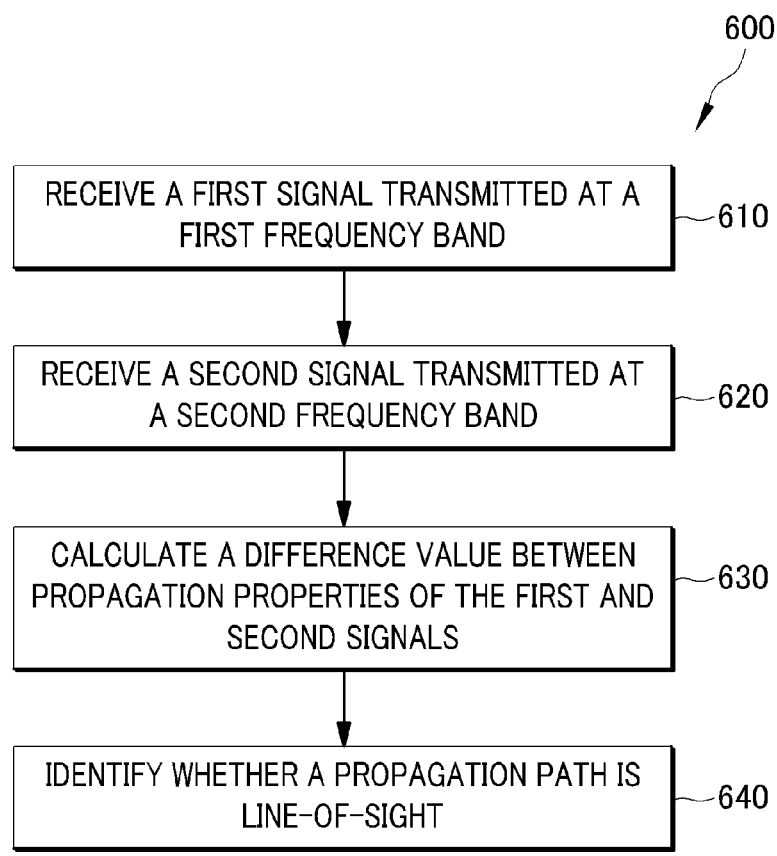
FIG. 6 shows an example flow diagram of a process to implement a wireless signal identification scheme, arranged in accordance with at least some embodiments described herein.

FIG. 6 shows an example flow diagram of a process to implement a wireless signal identification scheme, arranged in accordance with at least some embodiments described herein.

Process 600 may be implemented by a mobile device such as mobile device 110 including at least some of receiver unit 210, difference value calculation unit 220, identification unit 230 or position calculation unit 240. Process 600 may also be implemented by computer programs or program modules that may be adapted to provide a wireless signal identification scheme and hosted by mobile device 110, such as signal identification manager 310 including difference value calculation component 410 and identification component 420. Thus, reference may be made to the embodiments depicted and described with reference to FIGS. 1-5. Process 600 may include one or more operations, actions, or functions as illustrated by one or more blocks 610, 620, 630 and/or 640. Although illustrated as discrete blocks, various blocks may be divided into additional blocks, combined into fewer blocks, or eliminated, depending on the desired implementation. Processing may begin at block 610.

At block 610 (Receive a First Signal Transmitted at a First Frequency Band), mobile device 110 and/or receiver unit 210 may receive, from access point 120, first signal 130 at the first frequency band. By way of example, but not limitation, the first frequency band may be an ISM band. Processing may continue from block 610 to block 620.

At block 620 (Receive a Second Signal Transmitted at a Second Frequency Band), mobile device 110 and/or receiver unit 210 may receive, from access point 120, second signal 140 at the second frequency band. By way of example, but not limitation, the second frequency band may be a UNII band. Processing may continue from block 620 to block 630.

At block 630 (Calculate a Difference Value between Propagation Properties of the First and Second Signals), mobile device 110 and/or difference value calculation unit 220 may measure a propagation property of first signal 130 and that of second signal 140. Then, mobile device 110 and/or difference value calculation unit 220 may measure and/or calculate a difference value between the propagation properties of first signal 130 and second signal 140. By way of non-limiting example, the propagation property may include, but not limited thereto, a propagation loss, a reflection property, a diffraction property or an absorption property. Processing may continue from block 630 to block 640.

At block 640 (Identify Whether a Propagation Path is Line-of-Sight), mobile device 110 and/or identification unit 230 may identify whether a propagation path between mobile device 110 and access point 120 is line-of-sight or non-line-of-sight based on the difference value. In some embodiments, mobile device 110 and/or identification unit 230 may compare the difference value with a normal difference value of free-space propagation. In such cases, when the difference value is within a predetermined range of the normal difference value of free-space propagation, mobile device 110 and/or identification unit 230 may determine that the propagation path between mobile device 110 and access point 120 is line-of-sight.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
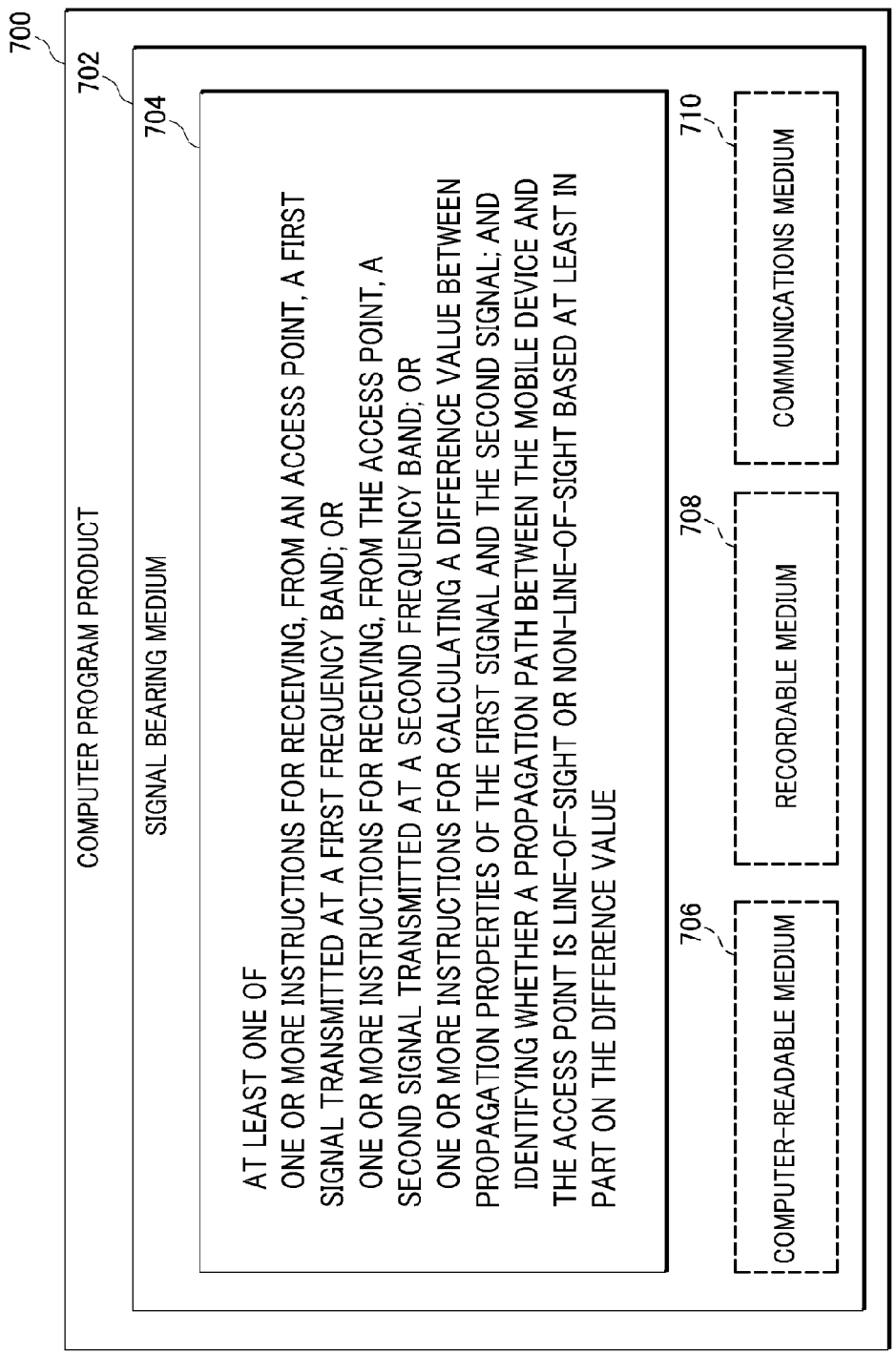
FIG. 7 illustrates an example computer program product that may be utilized to implement a wireless signal identification scheme, arranged in accordance with at least some embodiments described herein.

FIG. 7 illustrates an example computer program product 700 that may be utilized to implement a wireless signal identification scheme, arranged in accordance with at least some embodiments described herein.

As depicted, program product 700 may include a signal bearing medium 702. Signal bearing medium 702 may include one or more instructions 704 that, when executed by, for example, a processor of mobile device 110 may provide the functionality described above with respect to FIGS. 1-6. By way of example, instructions 704 may include: one or more instructions for receiving, from an access point, a first signal transmitted at a first frequency band; or one or more instructions for receiving, from the access point, a second signal transmitted at a second frequency band; or one or more instructions for calculating (and/or measuring) a difference value between propagation properties of the first signal and the second signal; or one or more instructions for identifying whether a propagation path between the mobile device and the access point is line-of-sight or non-line-of-sight based at least in part on the difference value.

In some implementations, signal bearing medium 702 may encompass a computer-readable medium 706, such as, but not limited to, a hard disk drive, a CD, a DVD, a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of electronic device 120 by an RF signal bearing medium 702, where the signal bearing medium 702 is conveyed by a wireless communications medium 710 (e.g., a wireless communications medium conforming with the IEEE 802.11 standard).

Figure 8:
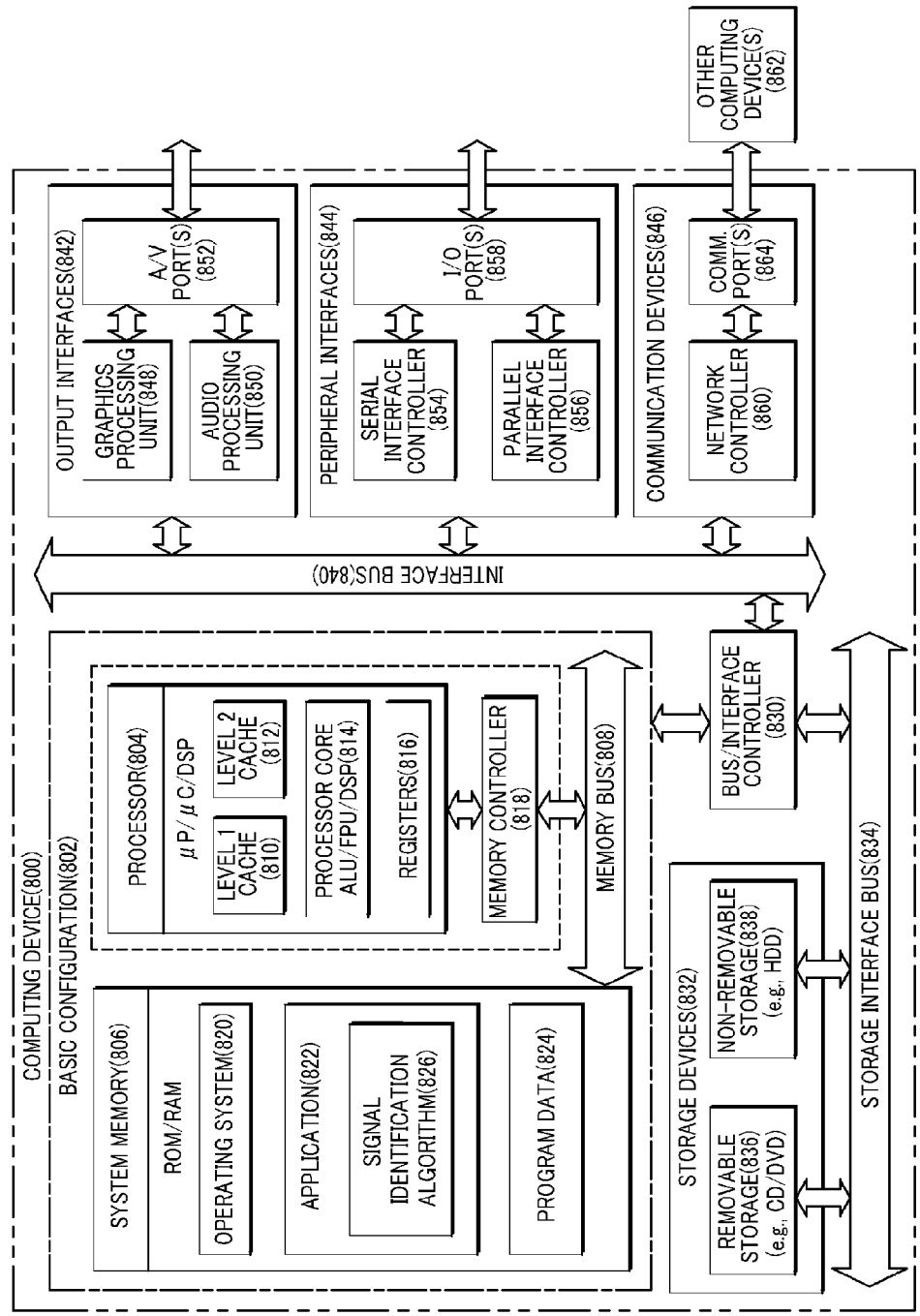
FIG. 8 is a block diagram illustrating an example computing device that may be utilized to implement a wireless signal identification scheme, arranged in accordance with at least some embodiments described herein.

FIG. 8 is a block diagram illustrating an example computing device 800 that may be utilized to implement a wireless signal identification scheme, arranged in accordance with at least some embodiments described herein.

In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one or more levels of caching, such as a level one cache 810 and a level two cache 812, a processor core 814, and registers 816. An example processor core 814 may include an arithmetic logic unit (ALU), a floating point unit (FPU), a digital signal processing core (DSP Core), or any combination thereof. An example memory controller 818 may also be used with processor 804, or in some implementations memory controller 818 may be an internal part of processor 804.

Depending on the desired configuration, system memory 806 may be of any type including but not limited to volatile memory (such as RAM), nonvolatile memory (such as ROM, flash memory, etc.) or any combination thereof. System memory 806 may include an operating system 820, one or more applications 822, and program data 824.

Application 822 may include an signal identification algorithm 826 that may be arranged to perform the functions as described herein including the actions described with respect to mobile device 110 architecture as shown in FIGS. 2-4 or including the actions described with respect to the flow chart shown in FIG. 6. Program data 824 may include any data that may be useful for providing the signal identification scheme as is described herein. In some examples, application 822 may be arranged to operate with program data 824 on an operating system 820 such that the wireless signal identification scheme as described herein may be provided.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 836, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 846) to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 846 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a mobile device, the method comprising:
    receiving, from an access point, a first signal transmitted at a first frequency band;
    receiving, from the access point, a second signal transmitted at a second frequency band, wherein the second frequency band is different from the first frequency band;
    measuring a difference value between propagation properties of the first signal and the second signal;
    identifying whether a propagation path between the mobile device and the access point is line-of-sight or non-line-of-sight based at least, in part, on the difference value; and
    calculating a current position of the mobile device based at least, in part, on the first signal and/or the second signal.

2. The method of claim 1, wherein the receiving the second signal is performed concurrently with the receiving the first signal.

3. The method of claim 1, wherein at least one of the first signal or the second signal includes location information of the access point, and
    wherein the
    calculating the current position of the mobile device comprises calculating the current position based at least, in part, on the location information of the access point.

4. The method of claim 3, wherein the calculating the current position of the mobile device is performed after the identifying indicates that the propagation path between the mobile device and the access point is line-of-sight.

5. The method of claim 1, further comprising:
    transmitting, to the access point, a probe request signal at the first frequency band, wherein the first signal includes a probe response signal in response to the probe request signal.

6. The method of claim 1, further comprising:
receiving, from the access point, a propagation environment signal transmitted at the first frequency band,
wherein the propagation environment signal includes at least one of information about a layout of a building, in which the access point and the mobile device are located, or information about materials of the building, and
wherein the identifying is further based at least, in part, on the propagation environment signal.

7. The method of claim 1, wherein each of the first signal and the second signal include a beacon signal.

8. The method of claim 1, wherein the measuring the difference value comprises measuring the propagation properties of the first signal and the second signal.

9. The method of claim 1, wherein each of the propagation properties is one selected from a group that includes a propagation loss, a reflection property, a diffraction property, and an absorption property.

10. The method of claim 1, wherein the access point includes a Wi-Fi access point.

11. The method of claim 1, wherein the first frequency band includes an Industry-Science-Medical (ISM) band and the second frequency band includes an Unlicensed National Information Infrastructure (UNII) band.

12. A mobile device, comprising:
a receiver unit configured to receive, from an access point, a first signal transmitted at a first frequency band and a second signal transmitted at a second frequency band, wherein the second frequency band is different from the first frequency band;
a difference value calculation unit configured to calculate a difference value between propagation properties of the first signal and the second signal;
an identification unit configured to identify whether a propagation path between the mobile device and the access point is line-of-sight or non-line-of-sight based at least, in part, on the difference value; and
a position calculation unit configured to calculate a current position of the mobile device based at least, in part, on the first signal and/or the second signal.

13. The mobile device of claim 12, wherein the receiver unit is configured to receive the first signal and the second signal concurrently.

14. The mobile device of claim 12, wherein at least one of the first signal or the second signal includes location information of the access point, and
wherein the position calculation unit is configured to calculate the current position of the mobile device based at least, in part, on the location information of the access point.

15. The mobile device of claim 14, wherein the position calculation unit is configured to calculate the current position of the mobile device after the identification unit identifies that the propagation path between the mobile device and the access point is line-of-sight.

16. The mobile device of claim 12, wherein the receiver unit is further configured to receive, from the access point, a propagation environment signal transmitted at the first frequency band,
wherein the propagation environment signal includes at least one of information about a layout of a building, in which the access point and the mobile device are located, or information about materials of the building, and
wherein the identification unit is further configured to identify the propagation path based at least, in part, on the propagation environment signal.

17. The mobile device of claim 12, wherein the first signal and the second signal include at least one of a probe response signal or a beacon signal.

18. The mobile device of claim 12, wherein each of the propagation properties is one selected from a group that includes a propagation loss, a reflection property, a diffraction property, and an absorption property.

19. The mobile device of claim 12, wherein the access point includes a Wi-Fi access point, and
wherein the first frequency band includes an Industry-Science-Medical (ISM) band and the second frequency band includes an Unlicensed National Information Infrastructure (UNII) band.

20. A non-transitory computer-readable storage medium having stored thereon computer-executable instructions that, in response to execution, cause a mobile device to perform or control performance of operations that comprise:
transmit, to an access point, a probe request signal at a first frequency band;
identify a probe response signal, received from the access point, that is transmitted at the first frequency band in response to the probe request signal;
identify a beacon signal, received from the access point, that is transmitted at a second frequency band, wherein the second frequency band is different from the first frequency band;
measure a difference value between propagation properties of the probe response signal and the beacon signal;
identify whether a propagation path between the mobile device and the access point is line-of-sight or non-line-of-sight based at least, in part, on the difference value; and
calculate a current position of the mobile device based at least, in part, on the probe response signal and/or the beacon signal.

21. The computer-readable storage medium of claim 20, wherein at least one of the probe response signal or the beacon signal includes location information of the access point, and
wherein the operations to calculate the current position of the mobile device include at least one operations that comprises:
calculate the current position based at least, in part, on the location information of the access point.

22. The computer-readable storage medium of claim 20, wherein each of the propagation properties is one selected from a group that includes a propagation loss, a reflection property, a diffraction property, and an absorption property.

23. The computer-readable storage medium of claim 20, wherein the access point includes a Wi-Fi access point, and
wherein the first frequency band includes an Industry-Science-Medical (ISM) band and the second frequency band includes an Unlicensed National Information Infrastructure (UNII) band.

* * * * *

UNITED STATES PATENT AND TRADEMARK OFFICE
CERTIFICATE OF CORRECTION

PATENT NO. : 9,971,016 B2
APPLICATION NO. : 14/785650
DATED : May 15, 2018
INVENTOR(S) : Kwak et al.

Page 1 of 1

It is certified that error appears in the above-identified patent and that said Letters Patent is hereby corrected as shown below:

In the Claims

In Column 14, Line 48, please delete "at least one operations" and insert -- at least one operation -- therefor.

Signed and Sealed this
Eleventh Day of February, 2020

Andrei Iancu
*Director of the United States Patent and Trademark Office*